United States Patent [19]
Roberts

[11] Patent Number: 5,265,829
[45] Date of Patent: Nov. 30, 1993

[54] TETRAHEDRAL LANDER

[75] Inventor: Michael L. Roberts, Kemah, Tex.

[73] Assignee: The United States of America as represented by the Administrator of the National Aeronautics and Space Administration, Washington, D.C.

[21] Appl. No.: 12,839

[22] Filed: Feb. 3, 1993

[51] Int. Cl.$^5$ .................................. B64G 1/14
[52] U.S. Cl. ...................... 244/160; 244/138 A; 244/100 A; 244/110 D; 244/113; 244/158 A; 244/138 R; 102/386
[58] Field of Search ............... 244/160, 138 A, 100 A, 244/110 D, 113, 158 A, 138 R, 146, 161, 121, 3.24; 102/386, 348

[56] References Cited

U.S. PATENT DOCUMENTS

| | | | |
|---|---|---|---|
| 2,969,211 | 1/1961 | Von Saurma | 244/138 |
| 3,197,158 | 7/1965 | Rogallo | 244/160 |
| 3,405,887 | 10/1968 | Mixson | 244/160 |
| 3,410,511 | 11/1968 | Coppa | 244/138 R |
| 3,421,714 | 1/1969 | Koerner | 244/1 |
| 3,520,503 | 7/1970 | McGehee | 244/138 |
| 3,613,580 | 10/1971 | Bench | 102/4 |
| 4,145,765 | 3/1979 | Malone | 244/138 R |
| 4,205,811 | 6/1980 | Palm et al. | 244/100 A |
| 4,565,341 | 1/1986 | Zacharin | 102/386 |
| 4,655,418 | 4/1987 | Melahn | 244/138 R |
| 4,832,288 | 5/1989 | Kendall et al. | 244/160 |
| 4,958,565 | 9/1990 | Koch | 102/386 |
| 5,033,384 | 7/1971 | Eckel et al. | 102/386 |
| 5,108,047 | 4/1992 | Puech | 244/113 |

FOREIGN PATENT DOCUMENTS 0217507  4/1987  European Pat. Off. ............ 244/160

OTHER PUBLICATIONS

Philip Bono, "How to Bring a Booster Back Alive" Popular Science, Jul. 1963.

*Primary Examiner*—Margaret A. Focarino
*Assistant Examiner*—Christopher P. Ellis
*Attorney, Agent, or Firm*—Hardie R. Barr; Guy M. Miller; Edward K. Fein

[57] ABSTRACT

An apparatus and method is disclosed for decelerating and absorbing impact of a re-entry vehicle suitable for payloads that are relatively light as well as payloads weighing several tons or more. The apparatus includes four inflatable legs displaced equidistantly from each other around a capsule or housing which contains a payload. The legs are inflated at a designated altitude after entering Earth's atmosphere to slow the descent of the re-entry vehicle. Connected between each of the four legs are drag inducing surfaces that deploy as the legs inflate. The drag inducing surfaces are triangularly shaped with one such surface being connected between each pair of legs for a total of six drag inducing surfaces. The legs have drag inducing outer surfaces which act to slow the descent of the re-entry vehicle.

16 Claims, 2 Drawing Sheets

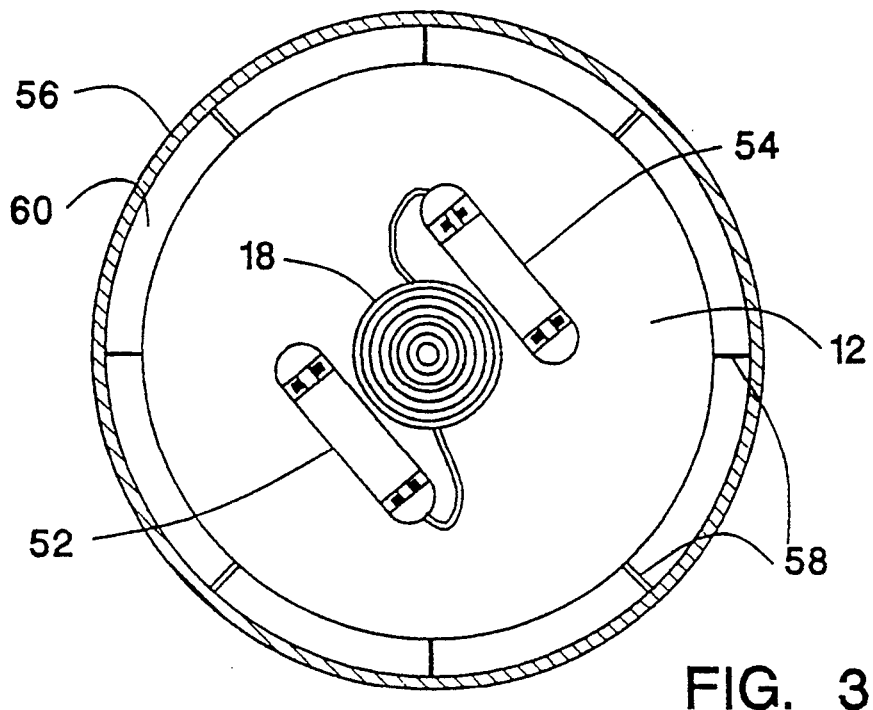
FIG. 3
FIG. 4
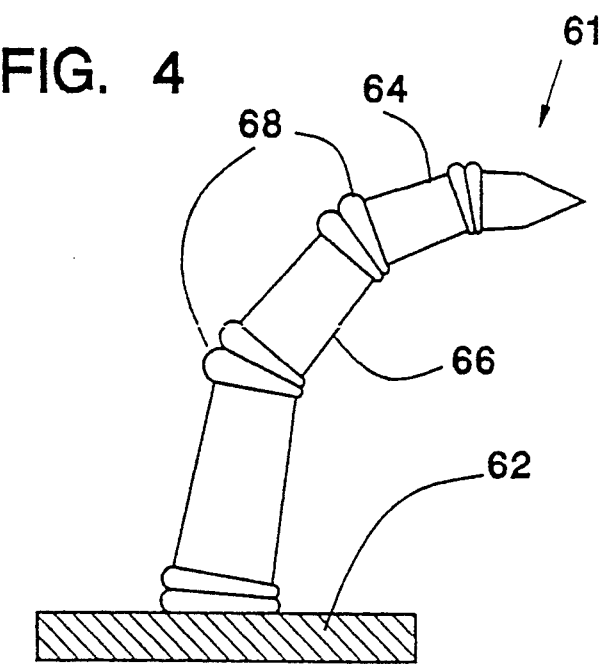

TETRAHEDRAL LANDER

ORIGIN OF THE INVENTION

The invention described herein was made by an employee of the United States Government and may be manufactured and used by or for the Government of the United States of America for governmental purposes without payment of any royalties thereon or therefor.

TECHNICAL FIELD

The present invention relates to apparatus and method for decelerating and absorbing landing impact of a re-entry vehicle. More particularly, the present invention is directed to apparatus having tetrahedrally disposed flexible legs that support drag enhancing surfaces for slowing descent of the vehicle. The legs flex to absorb the landing impact of the re-entry vehicle.

BACKGROUND ART

Landing devices are used to provide safe landing for packages or living passengers which fall from aircraft, spacecraft, or other high places. For the safe landing of re-entry spacecraft in particular, commonly used devices include parachutes, floating capsules for water landings, and retro-rockets.

The disadvantages of the commonly used devices for landing of re-entry vehicles or spacecraft are well known. Parachute cables may become entangled. Water landings require close timing of re-entry into the Earth's atmosphere. In poor weather, capsules are difficult to retrieve from the water. Retro-rockets may have reliability problems not discovered until the time of landing.

Prior inventors have recognized some of these problems. For instance, U.S. Pat. No. 2,969,211 to Von Saurma describes decelerating a projectile using an inflatable rotocoptor wing. Motion of the air spins the wing for absorbing energy and slowing the rate of vessel descent.

U.S. Pat. No. 3,421,714 to Koerner shows a re-entry vehicle having three or four metallic fins longitudinally disposed on an elongated hollow body. This drag device is suitable for small size payload packages, including small nuclear power plants. The vehicle rotates along its longitudinal axis to provide deceleration and heat dissipation. The fins protect the vehicle from the shock of landing along the edges of the cylinder but not at its end points.

U.S. Pat. No. 3,520,503 to McGehee shows an impact landing system that includes a segmented gas bag to absorb landing shock. The gas bag surrounds an instrument package for protection on impact. The gas bag segments include a plurality of inflatable compartments in communication with each other.

U.S. Pat. No. 3,613,580 to Bench discloses a wedge-shaped body with fluting that autorotates about its center of gravity. The autorotation creates a lift force that results in a longer glide pattern for wide dispersement of bomblets. Since the Bench patent is directed towards aerial mines or bomblets, no provision is made for soft landing of a payload package.

U.S. Pat. No. 4,958,565 to Koch shows a triangular inflatable decelerator structure. The structure attaches at the rear of a bomblet for slowing the descent by catching the aerodynamic flow in a manner similar to a parachute.

U.S. Pat. No. 5,108,047 to Puech discloses a deployable device having rigid panels connected by articulations to a support. The device deploys into a heat shield that decelerates the re-entry vehicle.

Despite progress made by these prior disclosures, a continued need exists for more effective means for slowing re-entry vehicles of various sizes and weight, particularly heavy re-entry vehicles weighing several tons or more. Preferably such a device would also include means for absorbing the landing impact to the vehicle. Such a device ideally should be so highly reliable that the re-entry vehicle may have living creatures on board. Those skilled in the art will appreciate the features of the present invention that solve these problems.

STATEMENT OF THE INVENTION

The present invention includes methods and apparatus for slowing and absorbing landing impact of a re-entry vehicle. The apparatus includes tetrahedrally disposed flexible legs that support drag enhancing surfaces for slowing the vehicle. The legs flex at impact to soften the landing of the re-entry vehicle.

The legs, which number four in a preferred embodiment, are disposed around the circumference of a capsule substantially equidistantly from each other. The legs are preferably inflatable and accordingly may be stowed in a small volume. The legs are deployed during descent to reach a comparatively large size with respect to the capsule. Since the legs are flexible, they bend during landing to absorb the impact. The present invention functions effectively with small payloads or payloads weighing several tons or more.

In a presently preferred embodiment, six triangular sails, or drag enhancing surfaces, are utilized along with drag inducing surfaces of the legs. Each sail connects between two of the four legs. The sails deploy as the flexible legs inflate. The sails are made of a fabric material. The sail material is chosen for the weight load. Heavy loads require high-strength fabric. Smaller loads may use nylon sails. Radar reflective materials may be interwoven or painted onto the sails to allow easy radar detection.

An objective of the present invention is to provide a drag device for slowing descent of a re-entry vehicle that also absorbs re-entry vehicle impact upon landing.

Another objective of the present invention is to provide flexible legs which support drag enhancing surfaces.

A feature of the present invention is the use of six drag inducing surfaces with one drag inducing surface connected between each possible pair of four cantilevered legs.

An additional feature of the present invention is the use of four cantilevered legs disposed substantially tetrahedrally from each other around a re-entry vehicle.

An advantage of the present invention is the inflatable legs that may be utilized for landing in the sea or, alternatively, on the land.

An additional advantage of the present invention is the high strength sails that may be utilized for landing vehicles weighing several tons or more.

BRIEF DESCRIPTION OF THE DRAWINGS

Other features and intended advantages of the present invention will be readily apparent by the references to the following detailed description in connection with the accompanying drawings, wherein:

FIG. 3 is an elevational representation, partially in section, of a tetrahedral lander before deployment of the flexible legs in accord with the present invention; and FIG. 4 is an elevational representation of a flexible leg having relatively inelastic components interconnected with pliable joints in accord with the present invention.

While the invention will be described in connection with the presently preferred embodiments, it will be understood that it is not intended to limit the invention to these embodiments. On the contrary, it is intended to cover all alternatives, modifications, and equivalents as may be included in the spirit of the invention.

DESCRIPTION OF THE PREFERRED EMBODIMENTS

The present invention describes an apparatus useful for decelerating and absorbing the impact of a re-entry vehicle. A preferred embodiment of the present invention includes stowed leg components that inflate after re-entry to decelerate the vehicle. The legs flex to absorb landing impact.

Figure 1:
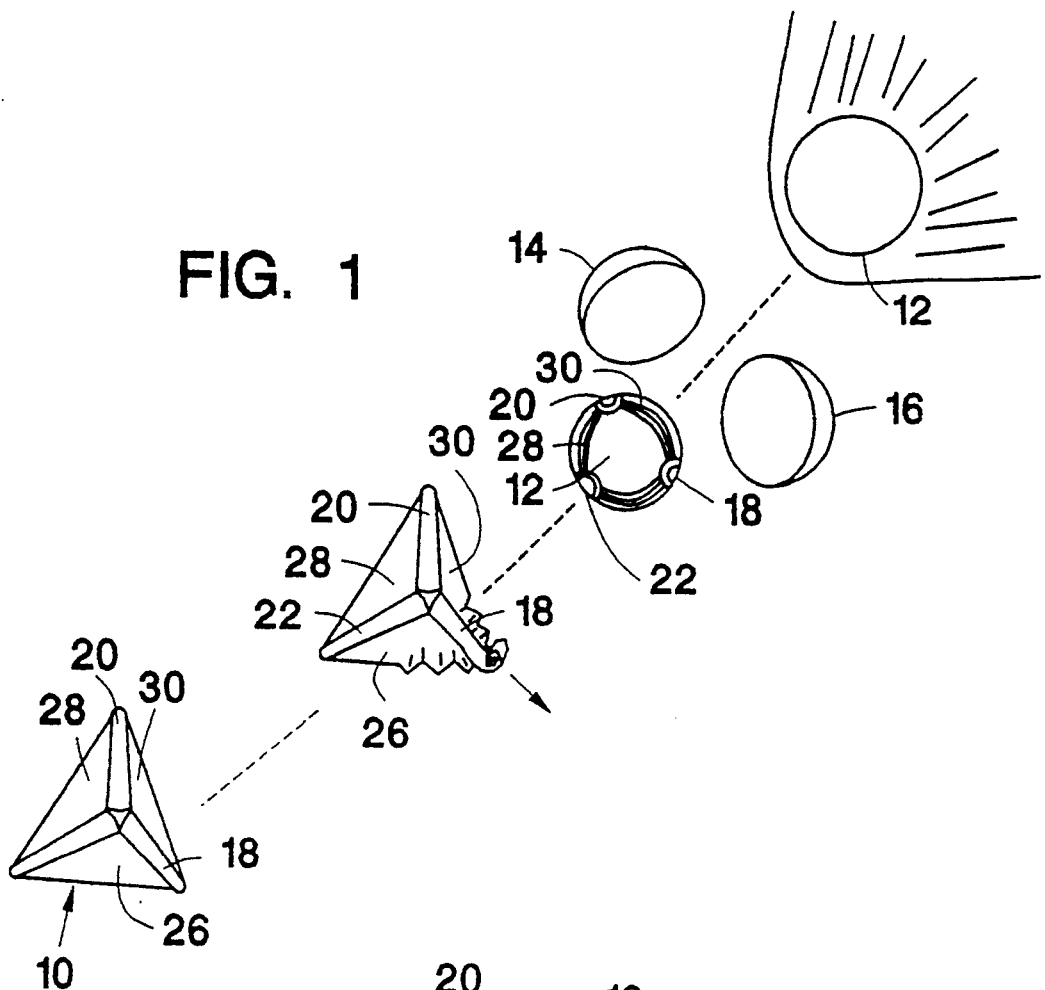
FIG. 1 is diagrammatic representation of the operation a tetrahedral lander from re-entry to landing in accord with the present invention.

The overall operation and physical description of tetrahedral lander 10 according to the present invention, is shown in the diagrammatic representation of FIG. 1. Capsule 12, with semi-spherical heat shields 14 and 16, enters Earth's atmosphere from orbit or other place in space. Semi-spherical heat shield 14 and 16 insulate capsule 12 from the high levels of heat generated during re-entry. Capsule 12 is essentially a housing in which is located a payload that may either be an object, living organism, or even a human being. Although heat shields 14 and 16 may combine to form a spherical body as shown, other shapes for a heat shield are useful as known to those skilled in the art.

After re-entering the Earth's atmosphere, capsule 12 slows significantly due to atmospheric friction. At the appropriate time, heat shields 14 and 16 may be ejected as shown in FIG. 1. Ejection of heat shields 14 and 16 expose, in a preferred embodiment, four inflatable legs including legs 18, 20, 22, and 36. The legs are substantially cylindrical along their length and thus have a substantially circular cross-section. Six drag sails, or drag enhancing surfaces, 26, 28, 30, 32, 34, and 35, are also exposed when heat shields 14 and 16 are ejected.

Drag enhancing surfaces are meant to describe surfaces that extend into, oppose, or resist the air flow around capsule or housing 12 to create a drag force that is generally opposite and largely parallel to the direction of motion of capsule 12. While drag inducing surfaces may refer to sails disposed between the legs, it may also refer to the surface of the legs themselves which also create a significant drag force. Viewing FIG. 1 and 2, it may be seen that the sails and/or the legs will oppose air flow regardless of the rotational position tetrahedral lander 10 may take with respect to the earth.

The preferred embodiment of tetrahedral lander includes four inflatable legs each spaced equidistantly from each other around the spherical surface of capsule 12. It is not necessary that the surface of capsule 12 be spherical but it is preferable that the inflatable legs be spaced equidistantly from each other in a generally tetrahedral configuration. By tetrahedral configuration, it is meant that the endpoints of the four legs could be connected by surfaces to form a tetrahedron which is a four-sided polygon. Such a four-sided polygon may include the shape of a pyramid with a triangular base. Thus, the legs essentially form the skeleton of a tetrahedral polygon when disposed in a tetrahedral configuration.

As the capsule reaches a predetermined altitude during descent, the inflatable legs fill with pressurized gas and expand. The inflated legs are cantilevered, or connected only on one end, to capsule 12. Though filled with pressurized air or other fluids, legs 18, 20, and 22 remain flexible enough for absorbing landing impact. Calculations of factors involved are discussed hereinafter. While tetrahedral lander 10 is discussed herein in terms of a reentry vehicle, the present invention also has uses for landing packages other than those returning from space i.e. packages dropped from an airplane or other high place.

Figure 2:
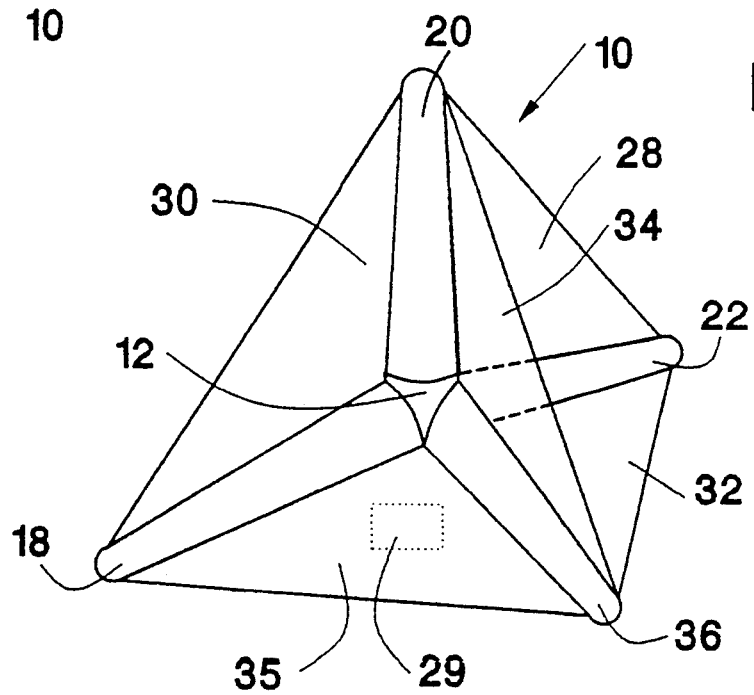
FIG. 2 is perspective representation of a tetrahedral lander in accord with the present invention.

FIG. 2 shows tetrahedral lander 10 in a rotated view with respect to FIG. 1 where all four legs may be seen and a different view of the sails, or drag inducing surfaces, is provided. Connected between legs 18, 20, 22, 36 are sails 26, 28, 30, 32, 34, and 35. Each sail is connected between one pair of legs. Thus, the sails deploy as the legs 18, 20, 22, and 36 (shown in FIG. 2) inflate. In a preferred embodiment, tetrahedral lander 10 includes six sails. While a plurality of legs could be used with the present invention, the presently preferred embodiment uses four tetrahedrally configured legs.

The sails used are substantially identical to each other and are generally triangularly shaped. They typically attach directly to the legs. For instance, sail 26 attaches directly to legs 18 and 22. However, they may also be connected to legs through a dash-pot (not shown) arrangement if desired for heavier loads and/or for greater flexibility.

The drag sails utilize high strength fabric for landing heavy loads. Such high strength fabric material might include fabric such as DuPont's Kevlar (TM). For lighter loads, other fabric material may be used, such as nylon. Preferably, the sails include radar reflective material such as aluminum coating or strip 29. Radar reflective material allows clear observance by radar of tetrahedral lander after deployment of the sails.

While the presently preferred embodiment uses drag sails, or drag enhancing surfaces, that are effectively separate components from the legs, the legs and sails could be combined. As well, for some payloads, the legs themselves could provide sufficient drag force to slow the landing vehicle. The legs could be inflated to large diameter size or to other shapes to essentially merge the operation of sails and legs. Thus, drag inducing surfaces of the sails, the legs, or both in combination may be used to slow the descent of capsule 12.

Capsule or housing 12 may include an inner gimbled portion (not shown) to maintain a fixed orientation of the payload with respect to Earth. The fixed orientation of an inner gimbled portion avoids the effects of any tumbling that may be problematic especially for use with living creatures. Such an inner gimbeled portion could be in the form of a semi-spherical cup mounted with bearings.

Inflatable legs 18, 20, 22, and 36 may be several times or more longer in length than the mean or average diameter of capsule or housing 12. The larger the legs and associated sails are with respect to the mass of capsule 12, the greater the deceleration effect will be. The length of the legs may be calculated to produce the desired terminal air speed. The inflatable material for construction of the legs may utilize additional plies or layers of material as necessary depending on the anticipated forces. The deceleration effect and necessary calculations are discussed in greater detail hereinafter.

FIG. 3 provides a view of inflatable leg 18, which is representative of other legs, prior to inflation. The legs are substantially similar to each other. Leg 18 is shown in a stowed position. Inflation bottles 52 and 54 may be altitude triggered to inflate leg 18. Heat shield 56 surrounds capsule 12 supported by stand offs 58. Insulating material having multiple layers may be placed between heat shield 56 and capsule 12 in volume 60.

If leg materials are used that do not stretch as much as may be required under load, joints in the legs, as shown in FIG. 4, may permit the necessary deformation in a controlled manner. Alternative embodiment leg 61 is also flexible to provide impact dampening for capsule 12. While sections such as 64 and 66 may be substantially inelastic, flexible joints such as joints 68 provide the desired flexibility for leg 61. It should be noted that flexible joints may also be used with legs that are rigid or partially inflatable to increase the leg flexibility as may be desirable. Thus, it is not necessary that the legs or any portion of the legs be inflatable.

The details of strength of the various components and other specifications necessary for the required deceleration force can be calculated from the following equations using the variables described below.

| | Variables: | |
|---|---|---|
| Fdrag | N | Drag force |
| S | m$^2$ | Cross section area of tetrahedron |
| mcap | kg | Mass of capsule |
| a | m/s$^2$ | Deceleration rate |
| rcap | m | Radius of capsule |
| m | kg | Total mass |
| Vterm | m/s | Terminal velocity |
| length | m | Length of tetrahedron leg |
| p | N/m$^2$ | Internal pressure in leg |
| d | m | Deceleration distance |
| nmax | N/m | Membrane stress in leg |
| Fleg | N | Force on each leg |
| mleg | kg | Mass of a leg |
| thick | m | Thickness of leg membrane |
| Fimpact | N | Total impact force |
| Mmax | N/m | Maximum moment in leg |
| rmax | m | Maximum radius of leg (at the root) |
| h | m | Height of capsule center |
| rmin | m | Radius of leg tip |
| time | s | Time to decelerate |
| A1 | m$^2$ | Area of leg tip |
| A2 | m$^2$ | Area of leg root |
| H | m | Cone height of leg |
| A3 | m$^2$ | Area of cone surface |
| plies | — | Number of plies |
| mmem | kg/m$^2$ | Area-Specific mass of the membrane material |
| mtetra | kg | Total mass of all 4 legs |
| g | m/s$^2$ | Gravitation acceleration |
| Rho | kg/m$^3$ | Air density |
| Cd | — | Coefficient of drag |
| tply | m | Thickness of a ply |
| mply | kg/m$^2$ | Area-specific mass of a ply |
| nply | N/m | Membrane strength of a ply |

Relationships:

1. For calculating terminal velocity, the following relationships apply.

$$Fdrag = 0.5 * Cd * Rho * Vterm^2 * S$$

$$Fdrag = m * g$$

$$S = length^2 * 1.161$$

where $1.161 = (\cos 19°)(\cos 30°)(1 + \sin 30°)$

2. For calculating the necessary deceleration distance, the following relationships apply.

$$d = 0.5 * Vterm * time$$

$$d = 0.5 * a * time^2$$

3. For calculating the impact force, the following relationships apply.

$$Mmax = Fleg * length$$

4. For calculating the necessary internal pressure to avoid buckling, the following relationships apply.

$$rmax = rcap * 0.816$$

$$p = 2 * Mmax / (PI * rmax^3)$$

5. For calculating the maximum membrane stress in leg, the following relationship applies.

$$nmax = p * rmax$$

6. For calculating the deceleration distance based on geometry, the following relationships apply.

$$h = length * 0.332$$

$$d = h - rcap$$

7. For calculating the leg surface area, the following relationships apply.

$$H = length - rcap * 0.58$$

$$rmin = length * 0.01$$

$$A1 = PI * rmin^2$$

$$A2 = PI * rmax^2$$

$$A3 = PI * (rmax + rmin) * SQRT(H^2 + (rmax - rmin)^2)$$

$$Aleg = A1 + A2 + A3$$

8. For calculating the number of plies in the leg, the following relationship applies.

$$plies = nmax / nply$$

9. For calculating the thickness of the leg membrane, the following relationship applies.

$$thick = plies * tply$$

10. For calculating the mass of the legs, the following relationships apply.

$$mmem = plies * mply$$

$$mleg = mmem * Aleg$$

$$mtetra = 4 * mleg$$

11. For calculating, the total mass of the lander, the following relationship applies.

$$m = m_{cap} + m_{tetra}$$

In operation, the legs inflate at a specific altitude and thus deploy the sails. The sails and legs create atmospheric drag on the capsule to slow descent to a relatively low terminal velocity. During descent, the legs and sails serve the same function as a parachute, or other drag enhancing surface, to produce a drag force substantially opposite to the direction of travel.

At impact against the Earth, the legs bend and splay outwardly to absorb the force of the landing. As the legs splay outwardly, the motion of capsule 12 toward the ground is slowed. The flexibility of the legs is designed to stop downward motion before capsule 12 hits the ground while still providing substantial downward movement after the legs hit ground during which velocity is reduced to zero. The impact energy absorbed will vary depending on the mass of capsule 12. The internal pressure within the legs is calculated to be large enough to prevent the legs from buckling during impact.

If the landing is made in water, the inflatable legs float to support capsule 12. If for some reason, the landing is made at an unexpected place, the shock-absorbing feature of the present invention provides an extra margin of safety.

The foregoing description of the invention has been directed in primary part to a particular, preferred embodiment in accordance with the requirements of the patent statutes and for the purposes of illustration. It will be apparent, however, to those skilled in the art that many modifications and changes in the specifically described tetrahedral lander may be made without departing from the scope and spirit of the invention. Therefore, the invention is not restricted to the preferred embodiment illustrated, but covers all modifications which may fall within the scope of the spirit of the invention.

I claim:

1. A landing vehicle for safe landing of a payload, comprising:
   a housing for receiving said payload;
   four flexible legs attached to said housing and extending radially outwardly from said housing, each of said four flexible legs being positioned substantially equidistantly from each other in a tetrahedral configuration around said housing; and
   a plurality of drag inducing surfaces associated with said four flexible legs.

2. The apparatus of claim 1, further comprising:
   an inflatable portion in each of said four flexible legs.

3. The apparatus of claim 2, further comprising: pl an altitude triggered pressurized bottle for inflating said inflatable portion for each of said four flexible legs.

4. The apparatus of claim 2, wherein:
   said four flexible legs extend outwardly in cantilevered fashion with respect to said housing when inflated.

5. The apparatus of claim 1, wherein:
   said plurality of drag inducing surfaces include at least a portion of an outer surface of said four flexible legs.

6. The apparatus of claim 1, wherein said drag inducing surfaces further comprise:
   six triangular sails formed from a fabric material.

7. The apparatus of claim 6, wherein:
   each of said six triangular sails is connected between two of said four flexible legs.

8. The apparatus of claim 6, further comprising:
   a radar reflective material in at least one of said six sails.

9. The apparatus of claim 1, wherein:
   said four flexible legs are of substantially the same length and each said flexible leg has a length more than two times greater than a mean diameter of said housing.

10. The apparatus of claim 1, further comprising:
    joint portions within said four flexible legs for inducing flexibility of said four flexible legs.

11. A method for safe landing of a payload, comprising the following steps:
    configuring four legs tetrahedrally about a housing which receives said payload;
    inflating said tetrahedrally configured four legs to effect deployment of said four legs in a cantilevered fashion with respect to said housing; and
    providing drag enhancing surfaces to restrict air motion around said landing vehicle.

12. The method of claim 11, further comprising the step of:
    deploying said drag enhancing surfaces substantially simultaneously with said step of inflating said four legs.

13. The method of claim 11, further comprising the step of:
    stowing said four legs in a collapsed position prior to said step of inflating said at least four legs.

14. The method of claim 11, wherein said step of providing drag enhancing surfaces includes:
    connecting a substantially triangular, fabric drag enhancing surface between each of said four legs to induce air friction.

15. The method of claim 14, further comprising the step of:
    shielding said collapsed four legs and said drag enhancing surfaces from heat prior to said step of inflating said four legs.

16. The method of claim 11, wherein the step of providing drag enhancing surfaces includes:
    forming six fabric material triangular-shaped sails each connected between two of said four flexible legs.

* * * * *